United States Patent
Peterkofsky et al.

(10) Patent No.: US 11,922,182 B2
(45) Date of Patent: Mar. 5, 2024

(54) MANAGING MULTI-SINGLE-TENANT SAAS SERVICES

(71) Applicant: Google LLC, Mountain View, CA (US)

(72) Inventors: Roy Peterkofsky, Mountain View, CA (US); William Earl, Mountain View, CA (US); Martin Taillefer, Redmond, WA (US); Michael Dahlin, Bellevue, WA (US); Chandra Prasad, Mountain View, CA (US); Jaroslaw Kowalski, Redmond, WA (US); Anna Berenberg, Saratoga, CA (US); Kristian Kennaway, Buckhurst Hill (GB); Alexander Mohr, Seattle, WA (US); Jaidev Haridas, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/646,479

(22) Filed: Dec. 29, 2021

(65) Prior Publication Data
US 2022/0121456 A1 Apr. 21, 2022

Related U.S. Application Data

(63) Continuation of application No. 17/099,717, filed on Nov. 16, 2020, now Pat. No. 11,221,860, which is a
(Continued)

(51) Int. Cl.
*G06F 9/44* (2018.01)
*G06F 8/71* (2018.01)
(Continued)

(52) U.S. Cl.
CPC ............ *G06F 9/44505* (2013.01); *G06F 8/71* (2013.01); *G06F 9/485* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 8,335,765 B2 | 12/2012 | Sivasubramanian et al. | |
| 9,521,194 B1 | 12/2016 | Gabrielson | |

(Continued)

OTHER PUBLICATIONS

International Search Report & Written Opinion for the related application PCT/US2018/041336 dated Oct. 17, 2018.
(Continued)

*Primary Examiner* — Wei Y Zhen
*Assistant Examiner* — Lanny N Ung
(74) *Attorney, Agent, or Firm* — Honigman LLP; Brett A. Krueger

(57) ABSTRACT

A system comprises data processing hardware and memory hardware. The memory hardware is in communication with the data processing hardware, and stores instructions that, when executed on the data processing hardware, cause the data processing hardware to perform a plurality of operations. In some examples, one of the operations may include receiving instance management configuration data for a single-tenant software-as-a-service (SaaS) application. Another operation may include further include receiving an image of the single-tenant SaaS application. Yet another operation can include generating, by the control plane manager, a control plane based on the instance management configuration data. The control plane is configured to create multiple instances of the single-tenant SaaS application based on the received image, and to manage the instances of the single-tenant SaaS application based on the received instance management configuration data. Another operation may include executing the control plane on the data processing hardware.

18 Claims, 6 Drawing Sheets

Related U.S. Application Data continuation of application No. 15/795,850, filed on Oct. 27, 2017, now Pat. No. 10,860,336.

(51) Int. Cl.
*G06F 9/445* (2018.01)
*G06F 9/48* (2006.01)
*G06F 9/50* (2006.01)

(56) References Cited

U.S. PATENT DOCUMENTS

| | | | |
|---|---|---|---|
| 9,575,740 | B2 | 2/2017 | Sankaranarasimhan et al. |
| 9,760,923 | B1 | 9/2017 | Felstaine et al. |
| 9,798,529 | B2* | 10/2017 | Traversat ............... G06F 8/60 |
| 9,858,105 | B1 | 1/2018 | Upadhyay et al. |
| 9,876,731 | B2* | 1/2018 | Martin ................. H04L 67/01 |
| 2004/0117476 | A1 | 6/2004 | Steele et al. |
| 2008/0051921 | A1* | 2/2008 | Nammatsu ............ G07F 19/20 700/97 |
| 2011/0072505 | A1 | 3/2011 | Ott |
| 2014/0075021 | A1 | 3/2014 | Revanuru |
| 2014/0136712 | A1 | 5/2014 | Kim et al. |
| 2014/0282458 | A1* | 9/2014 | Gupta ................... G05B 15/02 717/168 |
| 2014/0351399 | A1 | 11/2014 | Madani et al. |
| 2016/0105311 | A1 | 4/2016 | Thakkar et al. |
| 2016/0182473 | A1 | 6/2016 | Cignetti et al. |
| 2018/0075009 | A1* | 3/2018 | Baryshnikov ......... G06F 9/5072 |
| 2018/0084081 | A1* | 3/2018 | Kuchibhotla ....... H04L 41/0816 |
| 2018/0270165 | A1* | 9/2018 | Chen .................... G06F 9/4881 |
| 2018/0278675 | A1* | 9/2018 | Thayer ................ H04L 41/0806 |
| 2018/0314746 | A1* | 11/2018 | Gujarathi ............ G06F 16/9566 |

OTHER PUBLICATIONS

Korean Office Action for the related Application No. 10-2022-7034783, dated Aug. 16, 2023, 5 pages.

* cited by examiner

MANAGING MULTI-SINGLE-TENANT SAAS SERVICES

CROSS REFERENCE TO RELATED APPLICATIONS

This U.S. patent application is a continuation of, and claims priority under 35 U.S.C. § 120 from, U.S. patent application Ser. No. 17/099,717, filed on Nov. 16, 2020, which is a continuation of U.S. patent application Ser. No. 15/795,850, filed on Oct. 27, 2017. The disclosures of these prior applications are considered part of the disclosure of this application and are hereby incorporated by reference in their entireties.

TECHNICAL FIELD

This disclosure relates to managing multi-single-tenant software-as-a-service (SaaS) services.

BACKGROUND

Building software to be delivered as a service (SaaS) generally involves the handling of multiple users ("multi-tenancy"). One factor in managing multi-tenancy is the ability to create effective and reliable isolation of each of the multiple customers ("tenants"). Isolation between tenants serves two key objectives: security and performance. When tenants are given access into the shared resources, this access must be carefully controlled to ensure that one cannot access the data of others. Also, when tenants share key resources, a surge in resource demand from one tenant can starve other tenants, causing them to experience degraded performance. This is known as the "noisy neighbors" problem. At its extreme, one tenant can compromise an entire SaaS operation, knocking all other tenants out of service. Accordingly, it may be desirable to isolate tenants from each other as much as possible in order to minimize the effect of a single one of the tenants on other tenants. The greater the extent of the isolation between the individual tenants, however, the more burdensome it becomes to manage the architecture, as each tenant must be provisioned and operated individually.

SUMMARY

One aspect of the disclosure provides a system including data processing hardware and memory hardware. The memory hardware is in communication with the data processing hardware and stores instructions that, when executed on the data processing hardware, cause the data processing hardware to perform a plurality of operations. In some examples, one of the operations may include receiving instance management configuration data for a single-tenant software-as-a-service (SaaS) application. Another operation may include receiving a plurality of executable images of the single-tenant SaaS application. The images may include virtual machine images, container images, or a combination of virtual machine images and container images. Yet another operation can include generating, by a control plane manager, a control plane based on the instance management configuration data. The control plane is configured to create multiple instances of the single-tenant SaaS application based on the received images, and to manage the instances of the single-tenant SaaS application based on the received instance management configuration data. Another operation may include executing the control plane on the data processing hardware.

Implementations of the disclosure may include one or more of the following optional features. In some implementations, the control plane is configured for lifecycle management of the instances of the single-tenant SaaS application. The lifecycle management may include operations for creating, reading, updating, deleting, backing-up, restoring, restarting, and shutting down instances of the single-tenant SaaS application. The instance management configuration data defines the operations of the lifecycle management of the instances of the single-tenant SaaS application. In some examples, the instance management configuration data includes a plurality of selectable parameters for defining the lifecycle management of the instances of the single-tenant SaaS application.

In some implementations, the control plane is configured to create each instance of the single-tenant SaaS application on a virtual machine, a cluster of virtual machines, or a dedicated host device. The control plane may be configured to assess operating or usage metrics for each instance of the single-tenant SaaS application and to store the assessed operating or usage metrics in memory hardware in communication with the data processing hardware. The usage metrics may include latency, errors, bytes in/out, and calls to an instance, for example, or other metrics that are specific to the specialized functionality of the application.

In some implementations, the instance management configuration data includes a plurality of selectable parameters for creating instances of the single-tenant SaaS application. The parameters may include one or more of a deployment type, service rights, availability, security isolation levels, host locations, and monitoring and support parameters. In some examples, the instance management configuration data includes one or more instance templates including one or more predefined parameters.

Another aspect of the disclosure provides a method that includes receiving, at a control plane manager executing on data processing hardware, instance management configuration data for a single-tenant software-as-a-service (SaaS) application. The control plane manager may receive an image of the single-tenant SaaS application and generate a control plane based on the instance management configuration data. The control plane is configured to instantiate multiple instances of the single-tenant SaaS application based on the received image, and to manage the instances of the single-tenant SaaS application based on the received instance management configuration data. The control plane is executed on the data processing hardware according to the instance management configuration data.

This aspect may include one or more of the following optional features. In some examples, the control plane is configured for lifecycle management of the instances of the single-tenant SaaS application. The lifecycle management of the instances may include operations for creating, reading, updating, backing-up, restoring, restarting, shutting down, and deleting the single-tenant SaaS application. The lifecycle management of the instances of the single-tenant SaaS application may be defined by the instance management configuration data.

In some examples, the control plane is configured to create and deploy each of the instances of the single-tenant SaaS application on a virtual machine or dedicated host device. The control plane may be configured to assess operating or usage metrics for each instance of the single-tenant SaaS application and to store the assessed operating or usage metrics in memory hardware in communication with the data processing hardware. The usage metrics may include latency, errors, bytes in/out, and calls to an instance, for example.

In some examples, the instance management configuration data includes a plurality of selectable parameters for creating and managing the instances of the single-tenant SaaS application. The parameters may include one or more of a deployment type, service rights, availability, security isolation, host location, and monitoring and support. Moreover, the instance management configuration data may include one or more instance templates including one or more predefined parameters.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generally, cloud software environments are configured to host multiple instances of a single software application. For example, individual instances of a software application that may have traditionally been hosted locally, such as on a desktop computer, may now be hosted on a remote server or collection of servers and provided to the user on a pay-as-you-go basis in what is referred to as software as a service (SaaS) application.

For some SaaS applications, instances of the application are isolated in order to provide desired levels of security. For instance, a first customer using the SaaS application may need to be isolated from a second, competing customer using the SaaS application to ensure data privacy. A high level of isolation can be accomplished using multi-single-tenant (MST) SaaS applications, where multiple customers, or tenants, are segregated among singular instances of the SaaS application. While suitable for their purpose, MST SaaS applications present challenges in development and deployment, as multiple segregated instances are created and must be managed (e.g., updated, repaired, deleted) throughout the lifecycle of the SaaS application. To improve efficiency in creating and managing instances, cloud environments may utilize control planes, which provide a single hub for creating and managing all instances of a SaaS application. For example, an update to the SaaS application may be simultaneously pushed to all instances by the control plane, as opposed to having to be incorporated in each instance manually.

As more software applications transition to being SaaS applications, it has become increasingly important to increase the velocity at which control planes can be created for MST SaaS Applications. Accordingly, the instant disclosure provides, inter alia, a system and method for automating the creation of control planes for MST SaaS Applications, allowing service producers (i.e. software developers) to implement MST SaaS applications expeditiously.

Figure 1A:
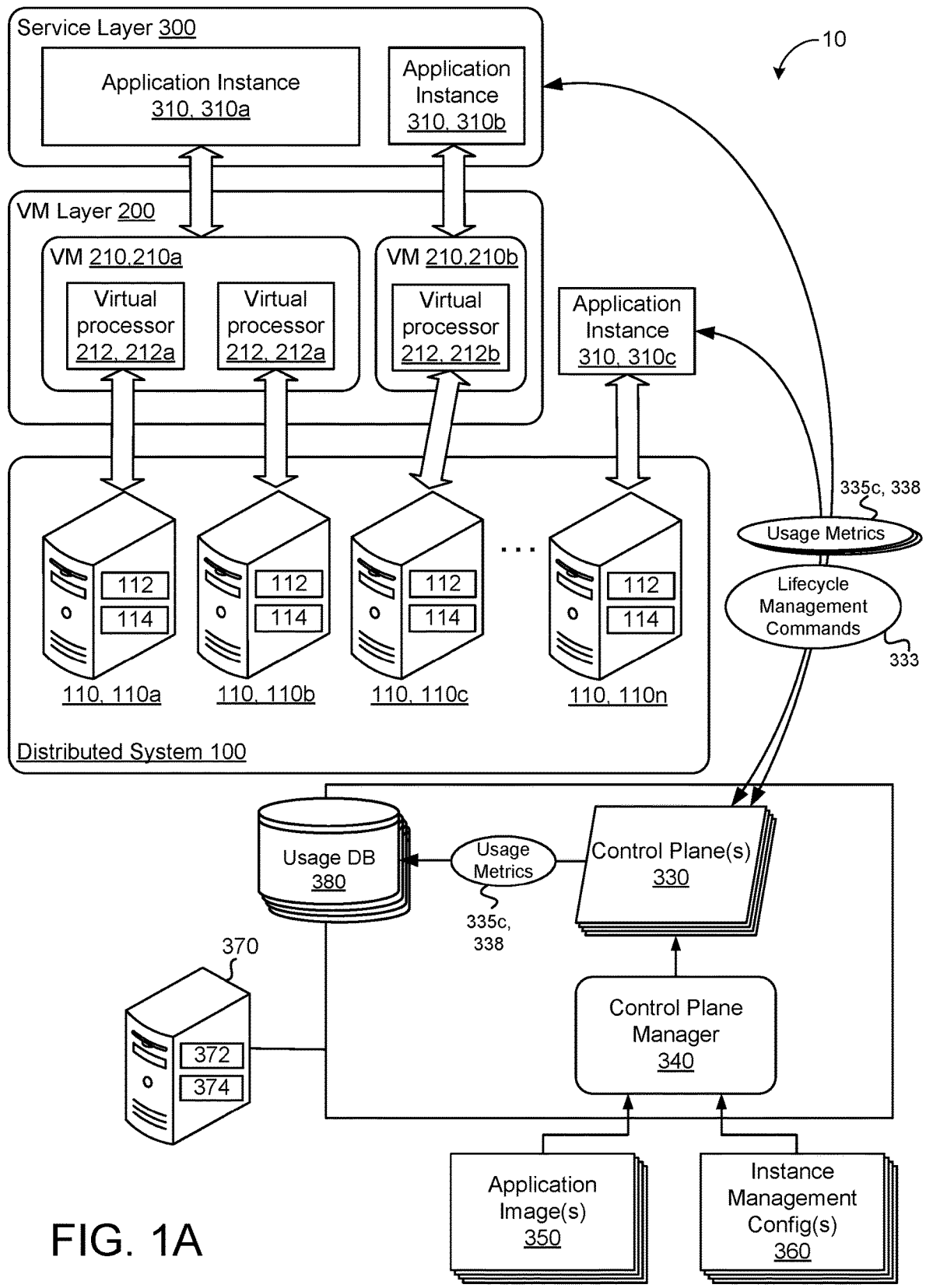
FIG. 1A-1D are schematic views of an example of a system for managing multi-single-tenant software-as-a-service (SaaS) services.

FIG. 1A provides an example of a multiple-single-tenant system 10. The system 10 includes a distributed system 100 including a plurality of loosely coupled servers 110, each of which typically includes a computing resource 112 (e.g., one or more computer processors) and/or storage resources 114 (e.g., physical memory, flash memory, and/or disks). The system 10 may include a virtual machine (VM) layer 200 comprising one or more virtual machines 210 configured to operate on the distributed system 100. In some examples, a single virtual machine 210, 210a may be allocated across a plurality of the servers 110, 110a, 110b, wherein a plurality of virtual processors 212, 212a, 212b cooperate to execute multiple tasks of a single virtual machine 210, 210a. Alternatively, one of the virtual machines 210, 210b may be hosted on a single one of the servers 110, 110c.

A service layer 300 may include a plurality of instances 310 of an application image 350 to be provided as a software-as-a-service (SaaS). The application image may include one or more virtual machine images, one or more container images, or a combination of virtual machine images and container images. Each application instance 310 may be hosted on a corresponding one of the virtual machines 210, 210a, 210b. For example, application instances 310, 310a requiring high availability and/or multi-region availability may be hosted on the virtual machine 210, 210a that is allocated among a plurality of the physical servers 110, 110a, 110b. In some examples, the application instances 310, 310b may hosted on dedicated virtual machines 210, 210b, such that each virtual machine 210, 210b is operated on a dedicated one of the servers 110, 110c. Additionally or alternatively, one or more application instances 310, 310c may be implemented and hosted directly on a dedicated server 110, 110n, without the use of a virtual machine 210.

Figure 1B:
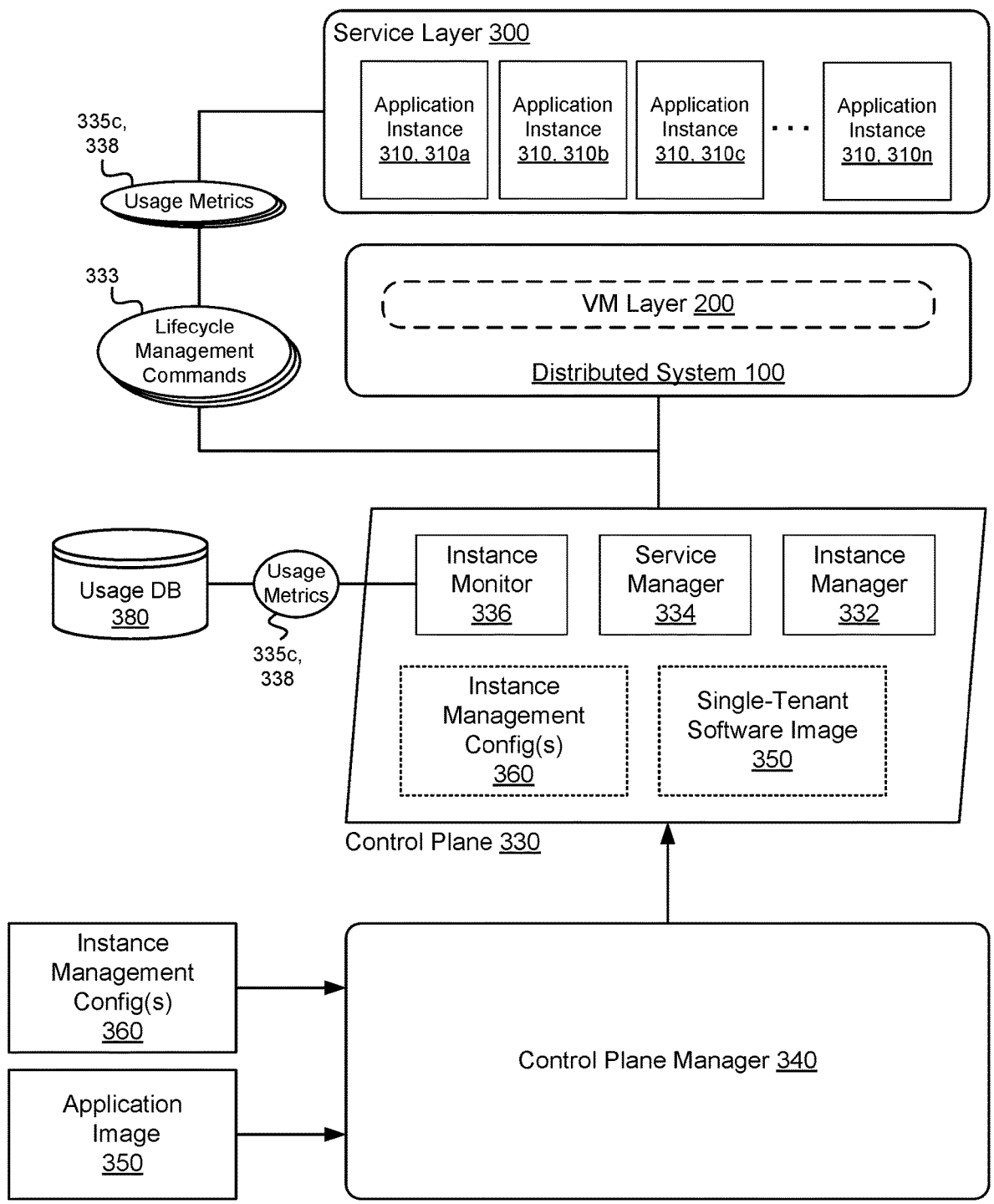

With continued reference to FIGS. 1A and 1B, the system 10 includes a control plane 330 and a control plane manager 340 each configured to operate on a server 370 having data processing hardware 372 and memory hardware 374. Although the server 370 is shown as a single server 370 independent of the servers 110 of the distributed system 100, in some examples, the control plane manager 340 and the control plane 330 may be hosted on one or more of the servers 110 of the distributed system 100. Additionally or alternatively, the control plane manager 340 and the control plane 330 may operate on separate servers 110 from each other. The system 10 may further include a usage database 380 in communication with the control plane 330, and configured to store metadata related to the usage and operation of the service layer 300, and more particularly, the application instances 310 of the service layer 300.

Figure 1C:
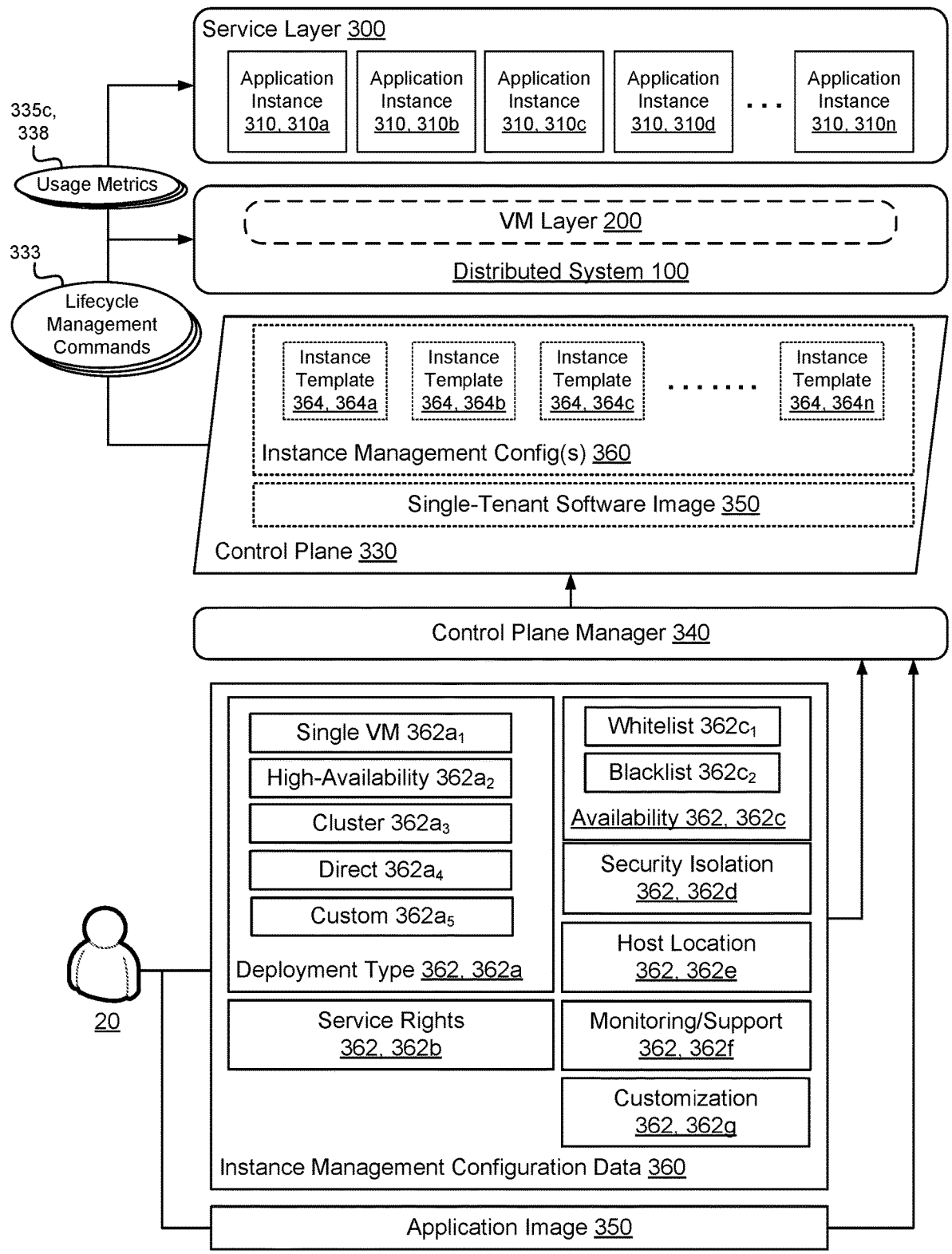

With reference to FIG. 1C, the control plane manager 340 is generally configured to receive an application image 350, and to generate the application control plane 330 for the application image 350 based on instance management configuration data 360 provided by a service producer 20 (i.e., party providing multi-single-tenant application). More particularly, the control plane manager 340 may generate executable script or logic defining creation and operation of the control plane 330, such that the control plane 330 can be executed by a service consumer 30 to generate the application instances 310. The script defining the control plane 330 may be parameterized, such that various properties of the application instance 310 can be selected by the service consumer 30 when new application instances 310 are generated, as described in greater detail below.

Figure 1D:
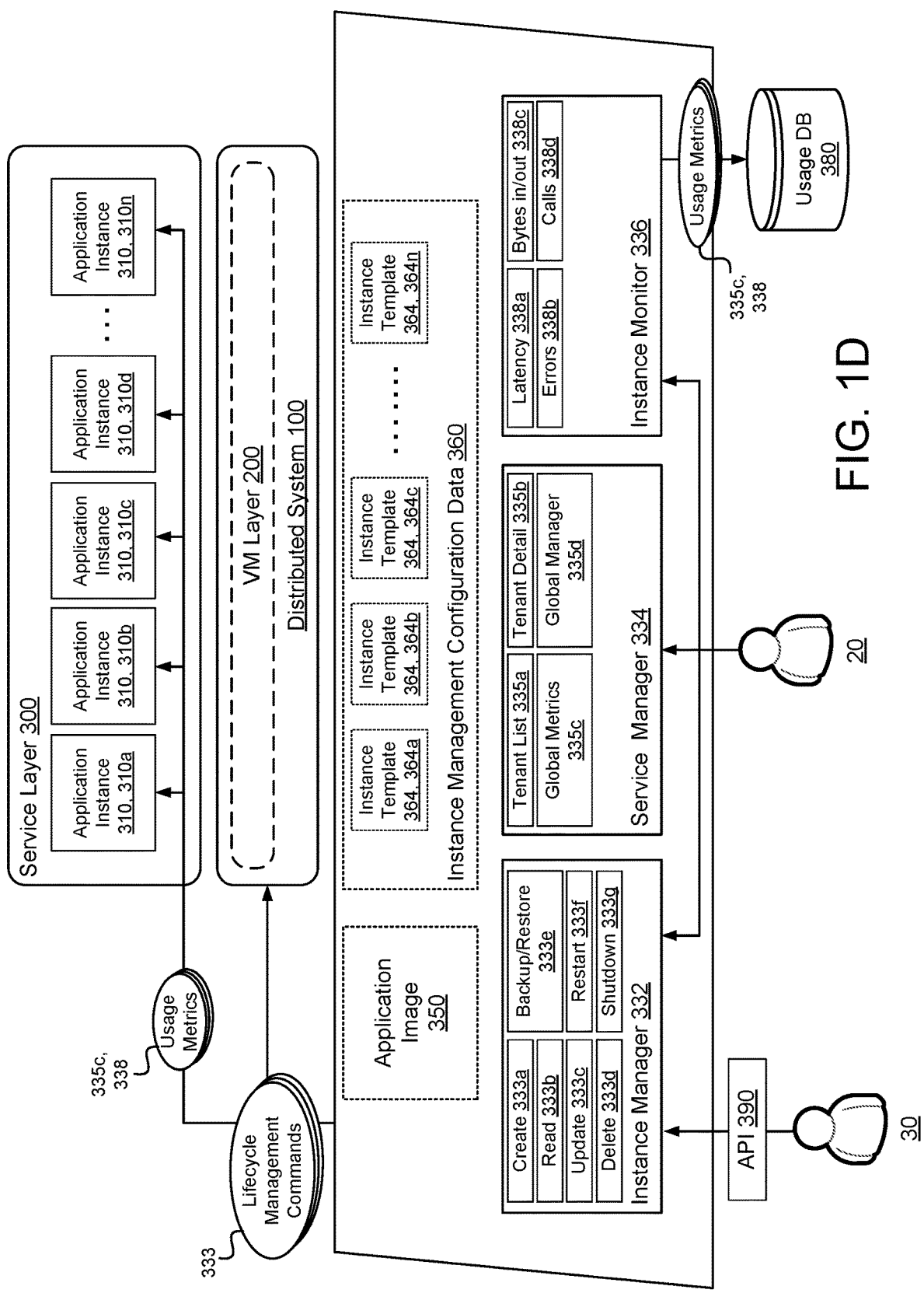

Along with generating the executable script of the control plane 330, the control plane manager 340 may also publish a standardized consumer application programming interface (API) 390 configured to provide access to the parameterized script of the control plane 330 by service consumers 30, as shown in FIG. 1D. For example, based on the instance management configuration data 360, the consumer API 390 may present alternative consumer-selectable parameters 362 and/or instance templates 364 for inclusion in the script of the control plane 330.

With continued reference to FIG. 1C, the instance management configuration data 360 may include a plurality of the parameters 362 and/or rules for generation and execution of the control plane 330. A portion of the parameters 362 may be fixed parameters 362 that correspond to creation of the executable script of the control plane 330, while another portion of the parameters 362 may include consumer-selectable parameters 362, 362a-362g related to desired properties of the application instances 310 to be selected by the service consumer 30 when a new application instance 310 is created.

In some examples, one of the consumer-selectable parameters 362 may include a deployment type 362, 362a. The deployment types 362, $362a_1$-$362a_5$ include single VM deployment $362a_1$, high-availability (HA) deployment $362a_2$, cluster deployment $362a_3$, direct deployment $362a_4$, and custom deployments $362a_5$. As discussed above, single VM deployment $362a_1$ associates a single application instance 310b with a single virtual machine 210, 210b. In contrast, HA deployment may allocate an application instance 310, 310a across two or more virtual machines 210, 210a, wherein one of the virtual machines 210, 210a acts as a primary, while the other virtual machine(s) are on standby. HA deployment $362a_2$ may be provided in different configurations, such as single zone, multi-zone, and multi-region configurations. Clustered deployment $362a_3$ allows the application instances 310 to be created on a combination of single VM deployments $362a_1$ and HA deployments $362a_2$. Moreover, as discussed above, application instances 310 may also be created in a direct deployment $362a_4$ configuration, whereby the application instance 310, 310c is hosted directly on the hardware of a server 110, 110n.

In addition to identifying the deployment type(s) 362, 362a, the parameters 362 may include designation of service rights 362, 362b. For example, the service producer 20 may define rights of the service consumer 30 with respect to creation, reading, updating, deletion, backing-up, and restoring application instances 310, as discussed in greater detail below. Alternatively or additionally, the service consumer 30 may define the rights of the service producer 20, to the extent allowed by the control plane 330.

The service producer 20 may also define availability 362, 362c of the control plane 330 and/or of application instances 310, 310c. The definition of availability 362, 362c may include a whitelist $362c_1$ of service consumers 30 or groups who are allowed to create and use application instances 310 and/or a blacklist $362c_2$ of service consumers 30 or groups who are prohibited from creating and using application instances 310. Availability 362, 362c may be based on predefined classes or scopes of service consumers 30. For example, service consumers 30 in particular geographical areas may be whitelisted or blacklisted.

The service producer 20 may also define various levels of security isolation 362, 362d that may be desired by different service consumers 30. For example banks and other agencies having highly-sensitive data may require higher levels of security isolation 362, 362d than service consumers 30 dealing with less sensitive data. In some examples, the levels of security isolation 362, 362d may include options having sufficient security isolation levels 362, 362d for achieving certifications like HIPAA (Health Insurance Portability and Accountability Act), MPAA (Motion Picture Association of America), and/or FISMA (Federal Information Security Management Act).

The instance management configuration data 360 may further include a parameter relating to allowed host locations 362, 362e. For example, the service producer 20 may designate particular hosting platforms (e.g., Google Cloud Platform, Amazon Web Services, Microsoft Azure, local server, etc.) where application instances 310 may be hosted. Accordingly, deployment scripts of the control plane 330 may be configured for automatic provisioning, creation, and operation of the application instances 310 on one or more of the host locations 362e based on the instance management configuration data 360. As discussed later, these various deployment scripts of the control plane 330 may be executed by the service consumer 30 during creation of an application instance 310, depending on which of the hosting platforms the service consumer 30 wishes to use.

In some examples, the instance management configuration data 360 includes monitoring and support parameters 362, 362f. Such parameters 362, 362f instruct the control plane 330 to assess various metrics of the service layer 300 and application instances 310.

With reference to FIG. 1D, upon creation of the control plane 330, one or more of the parameters 362, 362a-362f may be incorporated into one or more instance templates 364, 364a-364n, which may be accessed by the control plane 330. The instance templates 364, 364a-364n may include combinations of the parameters 362, 362a-362f which are commonly used by service consumers 30 in creating and using application instances 310. For example, a first instance template 364, 364a may be configured to automatically create an application instance 310 having high-availability deployment type $362a_2$, low security isolation 362d, and configured for creation and operation on a plurality of host locations 362e, while a second template 364, 364b may be configured to automatically create an application instance 310 for single VM deployment $362a_1$ and having high security isolation 362d. Additional or alternative instance templates 364, 364c-364n may be configured having any combination of the parameters 362, depending on projected use of the various parameters by service consumers 30.

Additionally or alternatively, the service producer 20 may define parameters that are available for customization 362, 362g by the service consumer 30. For example, the parameters 362, 362g may further include definitions for processes for handling wipeout, backup/restore, update/rollout, failures, etc. that are not included in an instance template.

When a service producer 20 wishes to implement a single-tenant software application as a multi-single-tenant (MST) SaaS, the service producer 20 will enter or select the parameters 362 to be included in the instance management configuration data 360 provided to the control plane manager 340. The control plane manager 340 is then executed to generate the control plane 330 based on the instance management configuration data 360.

Once created by the control plane manager 340, the control plane 330 is generally configured to manage and monitor a lifecycle of the application instances 310. As shown in FIG. 1B, the control plane 330 may include an instance manager 332, a tenant manager 334, and an instance monitor 336. Although illustrated as separate modules, the instance manager 332, tenant manager 334 (or service manager), and instance monitor 336 may be integrally configured, wherein the tasks associated with each module 332, 334, 336 are executed by a single program. The control plane 330 may further include the application image 350 and the instance management configuration data 360, including one or more of the instance templates 364.

As detailed in FIG. 1D, the instance manager 332 is configured to automate lifecycle management of each of the application instances 310, 310a-310n, and communicates a plurality of lifecycle management commands 333a-333g to the service layer 300. The lifecycle management commands 333a-333g may correspond to operations for creation 333a, reading 333b, updating 333c, deletion 333d, backup and restoration 333e, restarting 333f, and shutdown 333g of individual application instances 310, 310a-n. Creation 333a of an application instance 310 may include both provisioning and instantiation, such that the instance manager 332 is configured to provision a virtual machine 210 or server 110 by allocating resources for the application instance 310 on an as-needed basis, and to instantiate the application instance 310 on the provisioned host 110, 210. Updating 333c of an application instance 310 may include progressing an application instance 310 to a new version, and may also include rolling an application instance 310 back to a previous version in situations where a current version is undesirable. Additionally or alternatively, the control plane 330 configures network connectivity between servers 110, virtual machines 210, and service consumers 30. This may include configuring load balancers, firewalls, autoscalers, storage systems, and other services associated with providing secure and continuous network connectivity.

As shown, each of the service producer 20 and the service consumer 30 have access to the instance manager 332, such that the lifecycle management commands 333a-333g can be executed unilaterally by either party 20, 30. However, as introduced above, the service producer 20 may define the rights of the service consumer 30 in the instance management configuration data 360. For example, the service producer 20 may restrict access to one or more of the lifecycle management commands 333a-333g by the service consumer 30. Additionally or alternatively, the service producer 20 may assign rules to one or more of the lifecycle management commands 333a-333g, such as requiring the service producer 20 to approve execution of the one or more lifecycle management commands 333a-333g by the service consumer 30.

The service producer 20 may give the service consumer 30 rights to restrict access to or execution of one or more of the lifecycle management commands 333a-333g by the service producer 20. The service producer 20 may allow the service consumer 30 to "opt-in" to execution of any one of the lifecycle management commands 333a-333g, where the service consumer 30 must approve or accept the execution. For example, the service consumer 30 may be required to approve execution of the update command 333c, thereby allowing the service consumer 30 to control which version of the application instance 310 is being run.

With continued reference to FIG. 1D, the control plane 330 may further include a tenant manager 334 generally configured to provide global management and monitoring of the service layer 300. The tenant manager 334 may be configured to compile a tenant list 335a showing all service consumers 30 having application instances 310 in the service layer 300. Tenant details 335b may include identification and demographic information for each service consumer 30, parameters 362 assigned to the application instance 310 associated with each service consumer 30, and a listing of a current version of the application instance 310 associated with each service consumer 30.

The tenant manager 334 may be further configured to monitor global metrics 335c across all service consumers 30. For example, the tenant manager 334 may monitor collective usage of the distributed system 100 by the application instances 310, 310a-310n, as well as health-related metrics.

The tenant manager 334 may include a global manager 335d configured to provide functionality similar to the instance manager 332, but with respect to the service layer 300 as a whole. For example the global manager 335d may be configured to provide rolling, global updates 364d across all of the application instances 310, 310a-310n. The global manager 335d may also be configured to wipeout the service layer 300 by removing all service consumers 30 from the service layer 300 and, likewise, removing all application instances 310. With service consumers 30 and application instances 310 removed from the service layer 300, the global manager 335d may manage downstream dependencies of the removed application instances 310, and de-provision all corresponding instances of upstream services.

The control plane 330 may further include an instance monitor 366 configured to assess operating or usage metrics 336a-336d of each application instance 310, and to store the usage metrics 336a-336d in a usage database 380. The usage database 380 may be hosted in the memory hardware 374 of the server 370, as shown in FIG. 1A. The instance monitor 336 may assess usage metrics 338, 338a-338d including instance latency 338, 338a, errors 338, 338b, bytes in/out 338, 338c, and calls to the instance 338, 338d, for example. In some examples, additional metrics relating to the lifecycle of each application instance 310 are assessed by the instance monitor 336, as desired.

The assessed metrics 335c, 338 are then stored in the usage database 380 as metadata associated with each service consumer 30. The usage metrics 335c, 338 may then be exported from the usage database 380 to a desired analytics software (not shown). Additionally or alternatively, the control plane 330 executes analytics on the usage metrics 335c, 338, and provides a dashboard to the service producer 20 and/or service consumer 30 showing key metrics broken out by application instance 310 and/or services consumer 30. For example, the control plane 330 may show the service producer 20 health for each application instance 310, groups or zones of application instances 310, or for the services layer 300 as a whole, and allow the service producer to address potential problems at both the instance level and service level.

Figure 2:
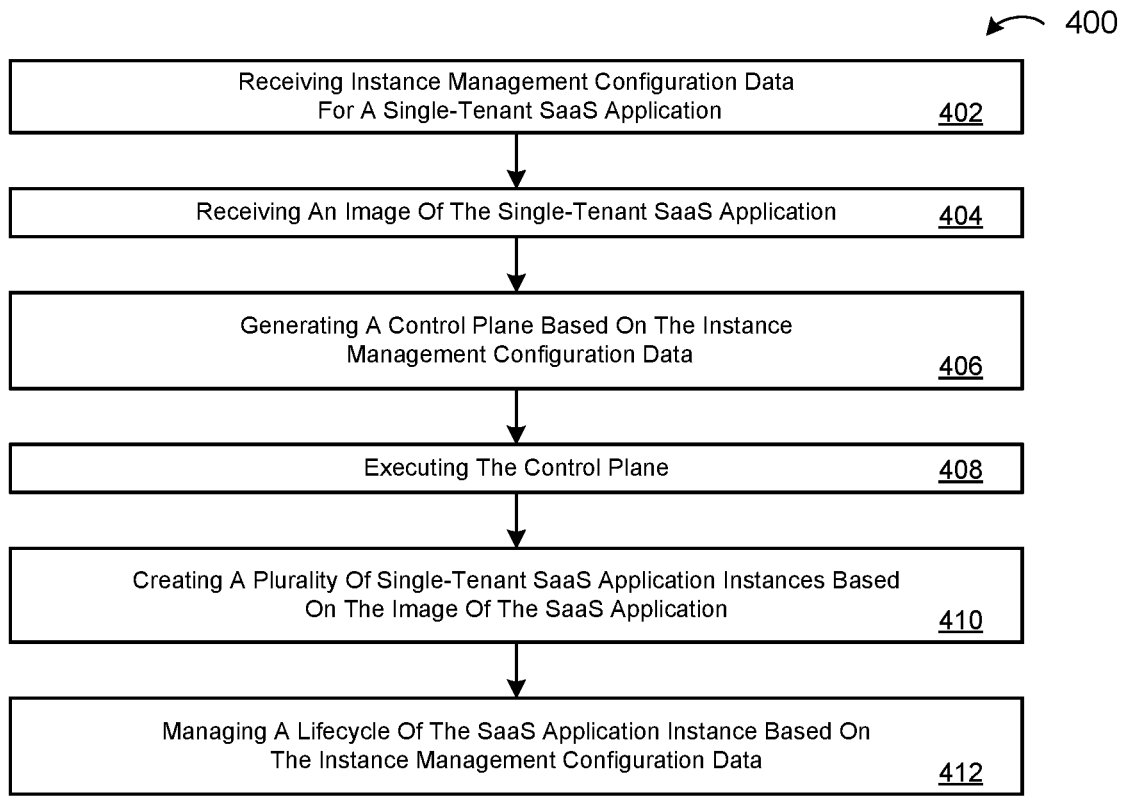
FIG. 2 is a flow diagram for an example method for managing multi-single-tenant SaaS services.

FIG. 2 illustrates an example of a method 400 of automatically implementing a multi-single-tenant SaaS application according the instant disclosure. At block 402, the method 400 includes receiving instance management configuration data 360 for a single-tenant SaaS Application. As provided above, the instance management configuration data 360 includes parameters 362 related to the creation and execution of the control plane 330 and application instances 310. At block 404, the method 400 includes receiving an image 350 of the single-tenant SaaS application. At block 406, the control plane manager 340 generates a control plane 330 based on the received instance management configuration data 360. The control plane 330 is configured to instantiate multiple application instances 310 of the SaaS application based on the received application image 350. Once generated, the control plane 330 may be executed, as shown at block 408, and one or more single-tenant SaaS application instances 310 may be created based on the application image 350 and the instance management configuration data 360, as shown at block 410. At block 412, the control plane 330 continues managing a lifecycle of the created application instances 310 based on the instance management configuration data 360. The lifecycle management may include operations for creating, reading, updating, deleting, backing-up, restoring, restarting, and shutting down instances 310 of the single-tenant SaaS application.

According to some implementations, a method, system, and computer-readable medium may be provided for provisioning multi-single-tenant (MST) software-as-a-service (SaaS) services. The method may be implemented by one or more processors of one or more computing devices and comprise receiving a single-tenant image of a software-as-a-service application, and receiving instance management configuration data for the single-tenant software-as-a-service application. The method may generate a control plane for the software-as-a-service application, the control plane being configured to generate a plurality of single-tenant instances of the software-as-a-service application based on the single-tenant image of the software-as-a-service application and to manage the plurality of single-tenant instances of the software-as-a-service application based on the received instance management configuration data. The single-tenant image of the software-as-a-service application and the instance management configuration data may be received by a control plane manager, which is configured to generate the control plane for the software-as-a-service application. In use, the control plane may generate a plurality of single-tenant instances of the software-as-a-service application based on the single-tenant image of the software-as-a-service application, and manage the plurality of single-tenant instances of the software-as-a-service application based on the instance management configuration data. In some implementations, the control plane may be configured to provide a common interface layer for each instance of the software-as-a-service application. In some implementations, each instance of the software-as-a-service application may be isolated from the other instances in a respective virtual machine instantiation. The control plane may be configured to obtain usage and/or operational metrics from one or more or each of the instances of the software-as-a-service application. The control plane may be configured to update one or more or each instance of the software-as-a-service application based on a respective instance management profile for each instance of the software-as-a-service application. In some implementations, one or more or each instance of the software-as-a-service application may be associated with a respective unique instance identifier and the control plane may be configured to interact with the one or more or each instance of the software-as-a-service application based on the respective unique instance identifier. For example, usage and/or operational metrics for the one or more or each instance of the software-as-a-service application may be stored in a common database based on the respective unique instance identifier. The software-as-a-service application may include one or more of application software, a database resource, a database management resource, a customer relationship management resource, among other application resources.

With some implementations of a multi-single-tenant SaaS system, each tenant may be effectively isolated to a separate instance, so that performance and security may be improved. There may be no need for a complex, multi-tenant architecture, but the system may be controlled and monitored through a single control plane. In some examples, virtualization and/or containerization of instances may allow ready scale-up and scale-down, for efficient resource management and usage. The control plane may provide for different scheduling of backups and/or updates, and for different levels of customization of the SaaS provision, between different tenants or users. Providing and managing separate instances for each tenant or user may allow management and/or data analytics to be performed more straightforwardly compared with multiple tenants provisioned in a single instance. Implementations of the system may provide common control and management of the instantiation and operation of multiple single-tenant instances of a SaaS service, which may offer the technical advantages of controlled isolation of individual instances, improved data security between different instances, improved reliability of the performance of each instance, improved security of data access and/or control between tenants and/or users, and improved efficiency of resource allocation for the various single-tenant instances.

Figure 3:
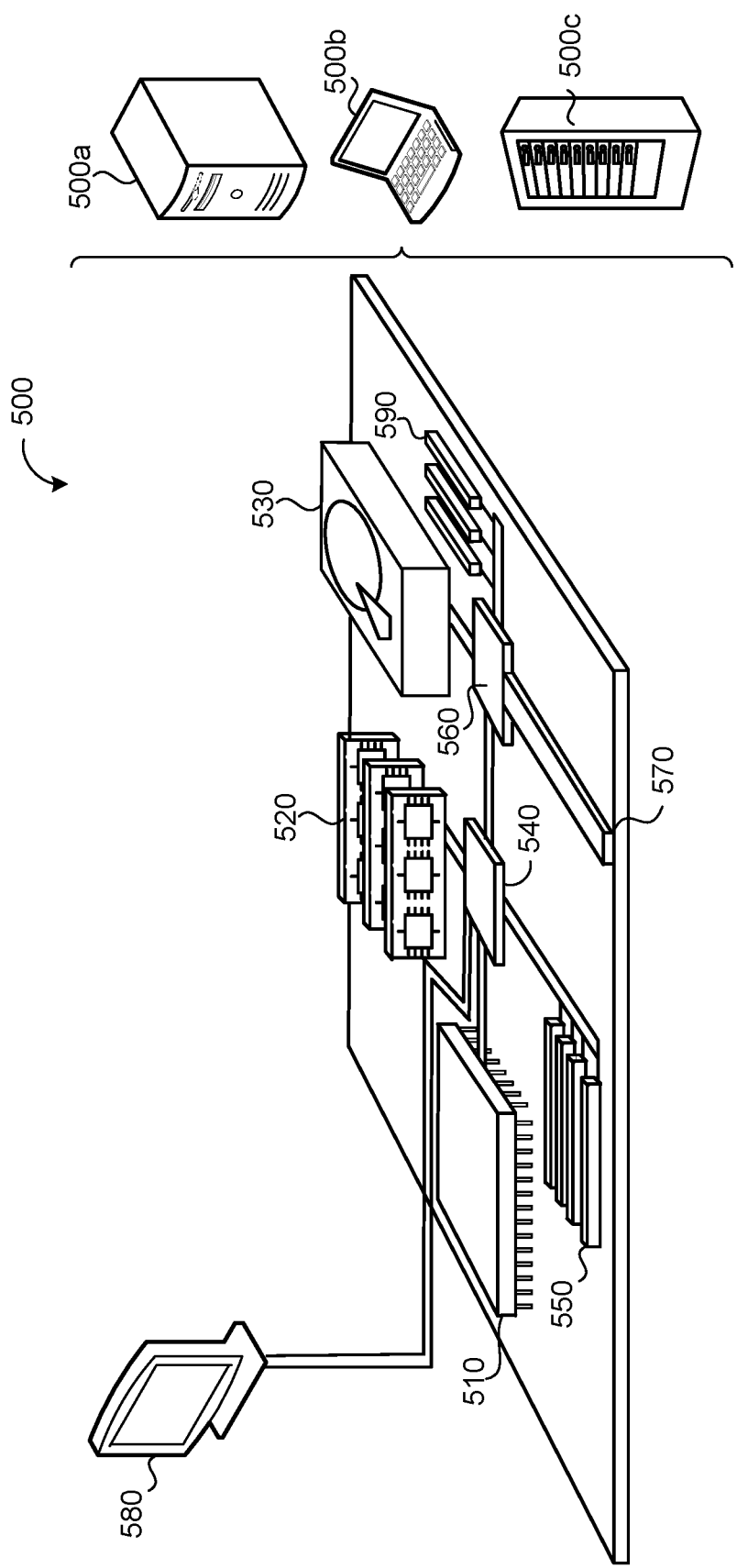
FIG. 3 is a schematic view of an example computing device that may be used to implement the systems and methods described herein.

FIG. 3 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
for each respective single-tenant software-as-a-service (SaaS) application of a plurality of single-tenant SaaS applications:
receiving instance management configuration data comprising rules for generation and execution of a corresponding control plane, the instance management configuration data comprising a consumer-selectable parameter selected by a user associated with the instance management configuration data, the consumer-selectable parameter comprising a multi-region availability configuration request;

receiving a container image of the respective single-tenant SaaS application;

generating the corresponding control plane based on the received instance management configuration data, the generated control plane configured to create one or more instances of the respective single-tenant SaaS application; and while the generated control plane executes, creating one or more additional instances of the respective single-tenant SaaS application in a plurality of regions based on the received instance management configuration data, wherein generating the corresponding control plane for the respective single-tenant SaaS application comprises generating an executable script that defines creation and operation of the corresponding control plane, the executable script comprising the consumer-selectable parameter.

2. The computer-implemented method of claim 1, wherein the generated control plane is configured for lifecycle management of each instance of the one or more additional instances of the respective single-tenant SaaS application, the lifecycle management comprising operations for reading, updating, and deleting a given instance of the one or more additional instances of the respective single-tenant SaaS application.

3. The computer-implemented method of claim 2, wherein the lifecycle management further comprises operations for backing up and restoring, restarting, and shutting down each instance of the one or more additional instances of the respective single-tenant SaaS application.

4. The computer-implemented method of claim 3, wherein the instance management configuration data defines the operations of the lifecycle management of each instance of the one or more additional instances of the respective single-tenant SaaS application.

5. The computer-implemented method of claim 1, wherein the generated control plane is configured to create and deploy each instance of the respective single-tenant SaaS application on a virtual machine or a dedicated host device.

6. The computer-implemented method of claim 1, wherein the generated control plane is configured to:
assess operating or usage metrics of each instance of the one or more additional instances of the respective single-tenant SaaS application; and
store the assessed operating or usage metrics at memory hardware in communication with the data processing hardware.

7. The computer-implemented method of claim 1, wherein the instance management configuration data for the respective single-tenant SaaS application further comprises a plurality of parameters for executing the one or more instances of the respective single-tenant SaaS application for one or more tenants.

8. The computer-implemented method of claim 7, wherein the parameters include at least one of:
service rights;
availability;
security isolation;
host location; or
monitoring.

9. The computer-implemented method of claim 1, wherein the instance management configuration data for the respective single-tenant SaaS application comprises one or more instance templates including one or more predefined parameters.

10. A system comprising:
data processing hardware; and
memory hardware in communication with the data processing hardware, the memory hardware storing instructions that when executed on the data processing hardware cause the data processing hardware to perform operations comprising:
for each respective single-tenant software-as-a-service (SaaS) application of a plurality of single-tenant SaaS applications:
receiving instance management configuration data comprising rules for generation and execution of a corresponding control plane, the instance management configuration data comprising a consumer-selectable parameter selected by a user associated with the instance management configuration data, the consumer-selectable parameter comprising a multi-region availability configuration request;
receiving a container image of the respective single-tenant SaaS application;
generating the corresponding control plane based on the received instance management configuration data, the generated control plane configured to create one or more instances of the respective single-tenant SaaS application; and
while the generated control plane executes, creating one or more additional instances of the respective single-tenant SaaS application in a plurality of regions based on the received instance management configuration data,
wherein generating the corresponding control plane for the respective single-tenant SaaS application comprises generating an executable script that defines creation and operation of the corresponding control plane, the executable script comprising the consumer-selectable parameter.

11. The system of claim 10, wherein the generated control plane is configured for lifecycle management of each instance of the one or more additional instances of the respective single-tenant SaaS application, the lifecycle management comprising operations for reading, updating, and deleting a given instance of the one or more additional instances of the respective single-tenant SaaS application.

12. The system of claim 11, wherein the lifecycle management further comprises operations for backing up and restoring, restarting, and shutting down each instance of the one or more additional instances of the respective single-tenant SaaS application.

13. The system of claim 12, wherein the instance management configuration data defines the operations of the lifecycle management of each instance of the one or more additional instances of the respective single-tenant SaaS application.

14. The system of claim 10, wherein the generated control plane is configured to create and deploy each instance of the respective single-tenant SaaS application on a virtual machine or a dedicated host device.

15. The system of claim 10, wherein the generated control plane is configured to:
assess operating or usage metrics of each instance of the one or more additional instances of the respective single-tenant SaaS application; and store the assessed operating or usage metrics at memory hardware in communication with the data processing hardware.

16. The system of claim 10, wherein the instance management configuration data for the respective single-tenant SaaS application further comprises a plurality of parameters for executing the one or more instances of the respective single-tenant SaaS application for one or more tenants.

17. The system of claim 16, wherein the parameters include at least one of:
service rights;
availability;
security isolation;
host location; or
monitoring.

18. The system of claim 10, wherein the instance management configuration data for the respective single-tenant SaaS application comprises one or more instance templates including one or more predefined parameters.

* * * * *